United States Patent
Nakamura

[11] 3,765,170
[45] Oct. 16, 1973

[54] COMPOSITE GAS TURBINE SET
[75] Inventor: Kenya Nakamura, Okazaki, Japan
[73] Assignee: Toyota Jidosha Kogyo Kabushiki Kaisha, Aichi-ken, Japan
[22] Filed: Dec. 15, 1971
[21] Appl. No.: 208,130

[30] Foreign Application Priority Data
Dec. 27, 1970 Japan.............................. 45/126239

[52] U.S. Cl.............................. 60/39.17, 60/39.51 R
[51] Int. Cl.............................. F02c 3/18, F02c 1/06
[58] Field of Search.................... 60/39.17, 39.16 R, 60/39.51 R, 39.15

[56] References Cited
UNITED STATES PATENTS

| | | | |
|---|---|---|---|
| 2,988,884 | 6/1961 | Pouit................................ | 60/39.17 |
| 2,298,663 | 10/1942 | Traupel............................. | 60/39.17 |
| 2,646,663 | 7/1953 | Sedille............................. | 60/39.51 R |
| 3,585,795 | 6/1971 | Grieb............................... | 60/39.16 |
| 3,611,716 | 10/1971 | Ferrari............................. | 60/39.51 R |
| 3,500,636 | 3/1970 | Craig................................ | 60/39.17 |
| 3,488,947 | 1/1970 | Miller et al....................... | 60/39.16 R |
| 3,306,036 | 2/1967 | Wooler............................. | 60/39.16 R |
| 3,635,019 | 1/1972 | Kronogard et al................. | 60/39.16 |
| 2,303,381 | 12/1942 | New.................................. | 60/39.17 |

FOREIGN PATENTS OR APPLICATIONS

| | | | |
|---|---|---|---|
| 749,267 | 5/1956 | Great Britain..................... | 60/39.17 |
| 622,053 | 4/1949 | Great Britain..................... | 60/39.17 |
| 999,133 | 10/1951 | France.............................. | 60/39.17 |
| 651,319 | 3/1951 | Great Britain..................... | 60/39.17 |

*Primary Examiner*—Carlton R. Croyle
*Assistant Examiner*—Warren Olsen
*Attorney*—Richard K. Stevens et al.

[57] ABSTRACT

A composite gas turbine set comprising a large main gas turbine set and a small auxiliary gas turbine set disposed in parallel arrangement for the production of regenerative cycles. A portion of the gas issued from a compressor of the main gas turbine set is applied to a compressor of the auxiliary gas turbine set. The exhaust gas which has provided regeneration in the auxiliary gas turbine set is applied to the turbine of the main gas turbine set. The composite turbine set is arranged so as to minimize increases in fuel consumption under widely variable load conditions.

2 Claims, 2 Drawing Figures

COMPOSITE GAS TURBINE SET

SUMMARY OF THE INVENTION

This invention relates to a composite gas turbine set which is used as a prime mover for loads which have wide variations, such as automobiles.

It has been known that for conventional gas turbines a higher heat efficiency can be obtained when the load applied to the turbine is in the neighborhood of its rated output, whereas in the region of low load the heat efficiency is far less when compared with other power sources. If a conventional gas turbine set is employed in a prime mover under conditions of large variation of load, such as in automobiles, the fuel consumption is comparatively deteriorated so that the turbine cannot be efficiently operated in practice.

With the development of heat resistant alloys, there have been proposed means for promoting the use of high temperatue and high compression gas so as to raise the efficiency of compressors and gas turbines, or to form composite cycles by coupling the low pressure and high pressure gas turbine sets in multiple phase to thereby elevate the heat efficiency for all cycles. To the present, however, a practical and economical gas turbine set has not yet appeared which satisfies the described need.

Therefore, it is the general object of the present invention to provide a gas turbine set in which combustion is as economical as desired when the variation in load is extremely great.

DESCRIPTION OF THE PREFERRED EMBODIMENTS

Figure 1:
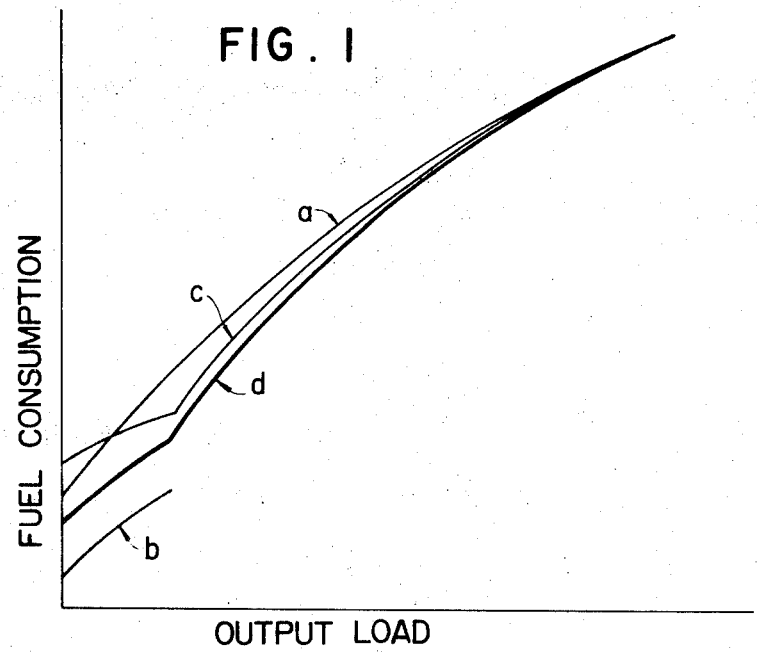
FIG. 1 is a diagrammatic view illustrating the relationship of the output of a gas turbine and the amount of fuel consumption.

FIG. 1 illustrates the relationship of an output load and the amount of fuel consumption. Line $a$ of FIG. 1 shows a curve for a large main gas turbine for general use and line $b$ is a curve depicting operation of a small auxiliary gas turnbine. As will be apparent from curved lines $a$ and $b$, the two kinds of gas turbines may be separately operated under loads respectively applied to the turbines so as to obtain the optimum output shown by curved line $a$, and the amount of combustion under low load shown by curved line $b$, whereby a most economical amount of combustion can be obtained. In the event the variation of the load is great, the large and small gas turbines must be operated at times in the state of no-load. As a consequence, the amount of fuel consumption under no-load will become, as shown by curved line $c$, about 20 percent of the fuel consumed under peak load.

Figure 2:
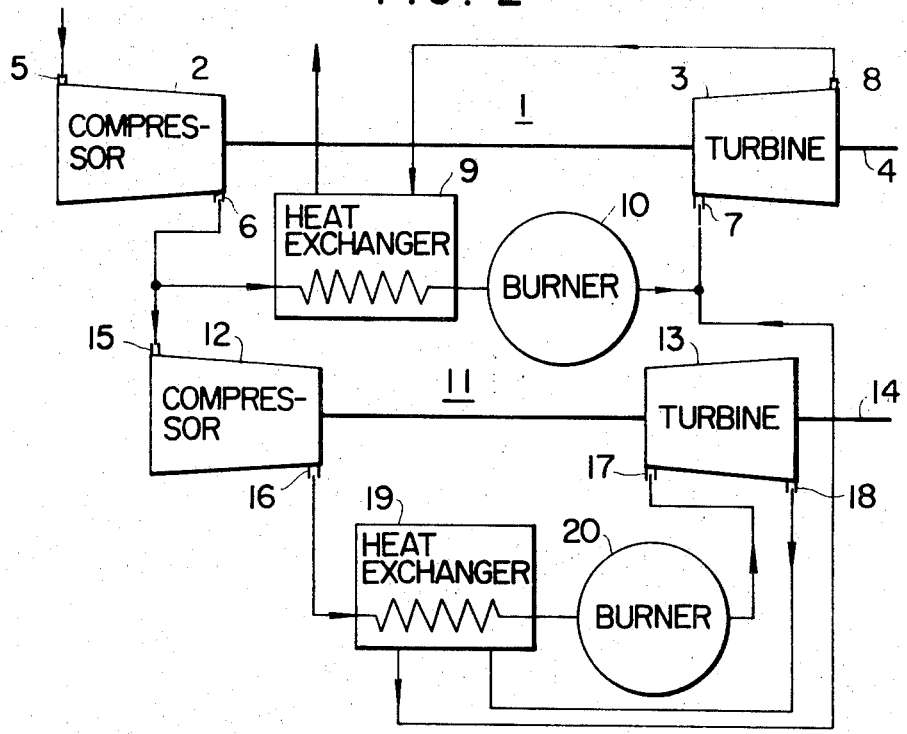
FIG. 2 is a block diagram showing a preferred example of the composite gas turbine set according to the present invention.

Thus, the object of the present invention is to obtain characteristics, as shown by curved line $d$, in order to reduce the fuel consumption during no-load conditions shown by curved line $c$. FIG. 2 illustrates a preferred embodiment of the composite gas turbine set of the present invention. In FIG. 2, a large main gas turbine set 1 having a main compressor 2 and a main turbine 3 is shown connected to a shaft 4, and a small auxiliary gas turbine set 11 having an auxiliary compressor 12 and an auxiliary turbine 13 is shown connected to a shaft 14, these large and small turbine sets further being provided in a parallel arrangement. The large main gas turbine set 1 is provided with an air intake 5 and a compression air outlet 6 in the compressor 2 and the turbine 3 is provided with an inlet port 7 for combustion gas and an exhaust port 8 for exhaust gas. Compressors 2 and 12 and turbines 3 and 13 may be of either the axial flow or radial flow type. Between the outlet 6 of compressor 2 and inlet port 7 of the turbine 3 are provided a main heat exchanger 9 and a main burner 10 which are connected in consecutive order. The exhaust port 8 of the turbine 3 is connected to the heat exchanger 9 thereby providing a regenerative cycle. In the small auxiliary gas turbine set 11, the compressor 12 has an air intake 15 and a compression air outlet port 16. The turbine 13 has an inlet port 17 for combustion gas and an exhaust port 18 for exhaust gas. There are also provided an auxiliary heat exchanger 19 and an auxiliary burner 20 between the compressor 12 and the turbine 13. The exhaust port 18 of the turbine 13 is connected to the heat exchanger 19 to thereby providing regenerative cycles. In this embodiment, the air intake 15 of the compressor 12 is connected to the compression air outlet 6 in the compressor 2 for the large main gas turbine. In the heat exchanger 19, the preheater side connected to the exhaust port 18 of the turbine 13 for the recovery of exhaust heat is connected to the inlet port 7 in the turbine 3 of the large main gas turbine set 1. Here, in the heat exchangers 9, 19, the heat exchanger 9 used in the large main gas turbine is preferably variable for efficient heat exchange. The heat exchanger 19 used in the small type gas turbine 11 may have a fixed value of efficiency for heat exchange, or it may be variable as desired.

With the construction as hereinabove described, air or other gases compressed in the compressor 2 of the large main gas turbine set 1 is preheated in the heat exchanger 9 and then heated by burner 10 for introduction into the turbine 3 for imparting a large output to the shaft 4. At the same time, air compressed in the compressor 2 of the large main gas turbine set 1 is compressed again in the compressor 12 for small auxiliary gas turbine set 11, which is in turn heated by the heat exchanger 19 and burner 20, and is introduced into turbine 13, whereby a relatively small output is obtained at the shaft 14. The exhaust gas carrying excess heat from the heat exchanger 19 is furnished to the large main gas turbine 1.

In operation, when the load is small, the large main gas turbine 1 is operated independently at a maximum frequency of revolution, while the small auxiliary gas turbine 11 is principally operated to supplement the operation of the large main gas turbine. Under large load, both gas turbines 1 and 11 operate at their rated outputs. In consequence, a combined output is obtained which approximates the sum total of the rated outputs of both gas turbines. In this case, it is quite possible to widen the output range under which low fuel consumption is obtained to about double the output of the large main gas turbine set 1 for single operation. In the composite gas turbine of the present invention, as hereinbefore described, both turbines are individually used according to the magnitude of the load respectively for large and small loads. This construction provides very economical operation preventing consumption of an excessive amount of fuel during combustion.

In order to secure the most economical fuel cost for specific operating conditions, it will be recognized that the kind, pressure and temperature of the suctioned gas and the appropriate frequency of revolution adapted for the pressure and temperature of the used gas must be selected for the particular application. These requirements will necessitate the control of output and supply of fuel for both gas turbines in the conventional manner.

In the composite gas turbine set according to the present invention, output is taken from both shafts 4 and 14 of the large main and small auxiliary gas turbine sets. However, variable speed gear, differential speed gear or a generating motor may also be used for externally connecting the shafts 4 or 14, or a single generator or single variable gear may be used for applying a load on the shaft 4 so as to make the rotations of shafts 4 and 14 dependent on the gas current flowing in the interior of the turbines. In the embodiment of FIG. 2, the exhaust gas is issued from the turbine 13 of the small auxiliary gas turbine set 11, passes across the heat exchanger 19, and concurrently flows with the combustion gas issued from the burner 10 in the large main gas turbine set 1. Alternatively, the point of concurrence of these flows may be located somewhere between the heat exchanger 9 and the burner 10 to obtain the same effect of combustion. More precise operation control can be realized by the provision of two or more sets of small auxiliary gas turbines as an alternative.

What is claimed is:

1. A composite gas turbine set comprising
    a. a main gas turbine set including
        1. a main compressor having air intake and exhaust ports,
        2. a main turbine having gas inlet and exhaust ports,
        3. a main burner coupled to the gas inlet port of said main turbine,
        4. a main heat exchanger having a preheater side, said heat exchanger being coupled between the exhaust port of said main compressor and said main burner, and
        5. means coupling the exhaust port of said main turbine to the preheater side of said heat exchanger for transferring heat from exhaust gas discharged from the exhaust port of said main turbine to air discharged from the exhaust port of said main compressor;
    b. an auxiliary gas turbine set including
        1. an auxiliary compressor having air intake and exhaust ports,
        2. an auxiliary turbine having gas inlet and exhaust ports,
        3. an auxiliary burner coupled to the gas inlet port of said auxiliary turbine, and
        4. an auxiliary heat exchanger having a preheater side, said auxiliary heat exchanger being coupled between the exhaust port of said auxiliary compressor and said auxiliary burner;
    c. means coupling the intake port of said auxiliary compressor to the exhaust port of said main compressor; and
    d. means coupling the preheater side of said auxiliary heat exchanger between the exhaust port of said auxiliary turbine and the intake port of said main turbine, said auxiliary heat exchanger transferring heat from exhaust gas discharged from the exhaust port of said auxiliary turbine to air discharged from the exhaust port of said auxiliary compressor.

2. A composite gas turbine set comprising
    a. a main gas turbine set including
        1. a main compressor having air intake and exhaust ports,
        2. a main turbine having gas inlet and exhaust ports,
        3. a main burner coupled to the gas inlet port of said main turbine,
        4. a main heat exchanger having a preheater side, said heat exchanger being coupled between the exhaust port of said main compressor and said main burner, and
        5. means coupling the exhaust port of said main turbine to the preheater side of said heat exchanger for transferring heat from exhaust gas discharged from the exhaust port of said main turbine to air discharged from the exhaust port of said main compressor;
    b. an auxiliary gas turbine set including
        1. an auxiliary compressor having air intake and exhaust ports,
        2. an auxiliary turbine having gas inlet and exhaust ports,
        3. an auxiliary burner coupled to the gas inlet port of said auxiliary turbine, and
        4. an auxiliary heat exchanger having a preheater side, said auxiliary heat exchanger being coupled between the exhaust port of said auxiliary compressor and said auxiliary burner;
    c. means coupling the intake port of said auxiliary compressor to the exhaust port of said main compressor; and
    d. means coupling the preheater side of said auxiliary heat exchanger between the exhaust port of said auxiliary turbine and the junction of said main heat exchanger and main burner, said auxiliary heat exchanger transferring heat from exhaust gas discharged from the exhaust port of said auxiliary turbine to air discharged from the exhaust port of said auxiliary compressor.

* * * * *